US011854085B1

(12) United States Patent
Ramos et al.

(10) Patent No.: US 11,854,085 B1
(45) Date of Patent: Dec. 26, 2023

(54) DISPLAY TOOL

(71) Applicant: Anesthesia and Pain Physicians of Florida, LLC, Bradenton, FL (US)

(72) Inventors: Fabian A. Ramos, Bradenton, FL (US); Cary A. Veith, Bradenton, FL (US); Tara A. Glenn, Bradenton, FL (US)

(73) Assignee: Anesthesia and Pain Physicians of Florida, LLC, Bradenton, FL (US)

( * ) Notice: Subject to any disclaimer, the term of this patent is extended or adjusted under 35 U.S.C. 154(b) by 0 days.

(21) Appl. No.: 18/223,895

(22) Filed: Jul. 19, 2023

(51) Int. Cl.
*G06Q 40/06* (2012.01)
*G06Q 40/04* (2012.01)

(52) U.S. Cl.
CPC ............. *G06Q 40/06* (2013.01); *G06Q 40/04* (2013.01)

(58) Field of Classification Search
CPC ................................ G06Q 40/06; G06Q 40/04
See application file for complete search history.

(56) References Cited

U.S. PATENT DOCUMENTS

| | | |
|---|---|---|
| 7,069,227 B1 | 6/2006 | Lintel, III et al. |
| 7,788,040 B2 | 8/2010 | Haskell et al. |
| 8,170,887 B2 | 5/2012 | Rosenfeld et al. |
| 8,332,466 B1 | 12/2012 | Cha et al. |
| 8,396,796 B1 | 3/2013 | Vu et al. |
| 9,734,541 B1 | 8/2017 | Pinsonneault |
| 10,896,190 B1 | 1/2021 | Potter et al. |
| 11,177,031 B2 | 11/2021 | Dominick et al. |
| 11,232,411 B2 | 1/2022 | Phillips |
| 2009/0094144 A1 | 4/2009 | Schmidt et al. |
| 2011/0021426 A1 | 1/2011 | Toll et al. |
| 2015/0100517 A1* | 4/2015 | Reddy ................ G06Q 40/06 705/36 R |

(Continued)

FOREIGN PATENT DOCUMENTS

| | | | | |
|---|---|---|---|---|
| EP | 3276558 A1 * | 1/2018 | ............. | G06Q 20/32 |
| WO | WO-2015081302 A1 * | 6/2015 | ............. | G06F 17/30 |

OTHER PUBLICATIONS

LenDRgroup Consulting: EBITDA and What It Reveals About Your Healthcare Practice, Aug. 29, 2022, Practice Financing, pp. 1-6 (Year: 2022).*

(Continued)

*Primary Examiner* — Bijendra K Shrestha
(74) *Attorney, Agent, or Firm* — AKERMAN LLP

(57) ABSTRACT

According to one example, a system includes an apparatus having a display, a memory, and one or more processors. For each of one or more non-equity contributing members of a company, the processors determine a value associated with the non-equity contributing member, and display the value in a respective first portion of one or more graphical user interfaces. Also, following each of one or more first periodic intervals, the processors determine a first current EBITDA, determine a bonus payout, and display the bonus payout in a respective second portion that shares a column or row with the respective first portion. Furthermore, following the sale of the company, the processors determine a second current EBITDA, determine a sale payout, and display the sale payout in a respective third portion that shares the column or row with the respective first portion. Additional processes are performed for other members of the company.

16 Claims, 3 Drawing Sheets

(56) References Cited

U.S. PATENT DOCUMENTS

| | | | | |
|---|---|---|---|---|
| 2015/0193872 A1* | 7/2015 | Ivanoff | ............... | G06Q 10/10 |
| | | | | 705/38 |
| 2015/0254612 A1* | 9/2015 | Mills | ............... | G06Q 40/06 |
| | | | | 705/7.15 |
| 2020/0160237 A1 | 5/2020 | Farooq et al. | | |
| 2021/0166793 A1 | 6/2021 | Mobarakeh | | |

OTHER PUBLICATIONS

Nacha: Understanding The Healthcare Electronic Funds Transfer (EFT) Standard, Sep. 1, 2015, The Electronic Payment Association, pp. 1-4 (Year: 2015).*

* cited by examiner

| | 304 INITIAL VALUE | 308 SHARES | 312 VALUE OF SHARES | 316a YEAR 1 VALUE | 320a YEAR 1 BONUS | 316b YEAR 2 VALUE | 320b YEAR 2 BONUS | 324 SALE PAYOUT |
|---|---|---|---|---|---|---|---|---|
| FOUNDING MEMBER A | $ 500,000 | 500,000 | $ - | $ - | $ - | $ - | $ - | $ 1,692,000 |
| EQUITY CONTRIBUTING FOUNDING MEMBER A | $ 18,000,000 | 18,000,000 | $ - | $ 21,000,000 | $ 300,000 | $ 24,000,000 | $ 600,000 | $ 60,900,000 |
| EQUITY CONTRIBUTING MEMBER B | $ 5,000,000 | 4,000,000 | $ - | $ 6,250,000 | $ 150,000 | $ 7,500,000 | $ 300,000 | $ 13,533,000 |
| FIRST NON-EQUITY CONTRIBUTING MEMBER C | $ 2,000,000 | - | $ - | $ 3,750,000 | $ 150,000 | $ 5,000,000 | $ 300,000 | $ 7,125,000 |
| SECOND NON-EQUITY CONTRIBUTING MEMBER D | $ - | - | $ - | $ 600,000 | $ 90,000 | $ 1,750,000 | $ 210,000 | $ 1,250,000 |
| REFERRING ENTITY E | $ 700,000 | - | $ - | $ - | $ - | $ - | $ - | $ 1,000,000 |
| TOTALS | $ 26,200,000 | 22,500,000 | $ - | $ 31,600,000 | $ 690,000 | $ 38,250,000 | $ 1,410,000 | $ 85,500,000 |

FIG. 3

DISPLAY TOOL

TECHNICAL FIELD

This disclosure relates generally to a display tool, and more specifically to a display tool that provides information in a consolidated manner.

BACKGROUND

In a variety of industries, it is standard practice for companies to provide information about the company in the form of multi-page paper or electronic documents distributed periodically. For example, investors in the company commonly receive information about their account in large paper or electronic documents that are distributed quarterly. However, such documents (which may be viewed via graphical user interfaces) tend to be quite complex, given the large volume of data to which they provide access. Additionally, such documents tend to only be updated on a periodic basis, which can render the information stale.

SUMMARY

According to a first example, an apparatus includes a display, a memory, and a hardware processor communicatively coupled to the memory. For each of one or more founding members of a company that includes one or more healthcare practices, the processor may determine a value associated with the respective founding member, display, on the display, the value associated with the respective founding member in a respective first cell of one or more graphical user interfaces, determine a number of shares in the company owned by the respective founding member; display, on the display, the number of shares in the company owned by the respective founding member in a respective second cell of the one or more graphical user interfaces that shares a first column or row with the respective first cell of the one or more graphical user interfaces, determine a current value associated with the number of shares in the company owned by the respective founding member, and display, on the display, the current value associated with the number of shares in the company owned by the respective founding member in a respective third cell of the one or more graphical user interfaces that shares the first column or row with the respective first cell of the one or more graphical user interfaces. Following a sale of the company, and for each of the one or more founding members, the processor may determine a sale payout to the respective founding member based on the number of shares in the company owned by the respective founding member, display, on the display, the sale payout to the respective founding member in a respective fourth cell of the one or more graphical user interfaces that shares the first column or row with the respective first cell of the one or more graphical user interfaces, and process, for payment, the sale payout to the respective founding member. For each of one or more equity contributing members of the company, the processor may determine a value associated with the respective equity contributing member, where the value associated with the respective equity contributing member is based on a base earnings before interest, taxes, depreciation and amortization (EBITDA) associated with the respective equity contributing member, display, on the display, the value associated with the respective equity contributing member in a respective fifth cell of the one or more graphical user interfaces, determine a number of shares in the company owned by the respective equity contributing member, display, on the display, the number of shares in the company owned by the respective equity contributing member in a respective sixth cell of the one or more graphical user interfaces that shares a second column or row with the respective fifth cell of the one or more graphical user interfaces, determine a current value associated with the number of shares in the company owned by the respective equity contributing member, and display, on the display, the current value associated with the number of shares in the company owned by the respective equity contributing member in a respective seventh cell of the one or more graphical user interfaces that shares the second column or row with the respective fifth cell of the one or more graphical user interfaces. Following each of one or more first periodic intervals, and for each of the one or more equity contributing members, the processor may determine a first current EBITDA associated with the respective equity contributing member, determine a bonus payout to the respective equity contributing member based on a difference between the first current EBITDA associated with the respective equity contributing member and the base EBITDA associated with the respective equity contributing member, display, on the display, the bonus payout to the respective equity contributing member in a respective eighth cell of the one or more graphical user interfaces that shares the second column or row with the respective fifth cell of the one or more graphical user interfaces, and process, for payment, the bonus payout to the respective equity contributing member. Following the sale of the company, and for each of the one or more equity contributing members, the processor may determine a sale payout to the respective equity contributing member based on the number of shares in the company owned by the respective equity contributing member, display, on the display, the sale payout to the respective equity contributing member in a respective ninth cell of the one or more graphical user interfaces that shares the second column or row with the respective fifth cell of the one or more graphical user interfaces, and process, for payment, the sale payout to the respective equity contributing member. For each of one or more non-equity contributing members of the company, the processor may determine a base EBITDA associated with the respective non-equity contributing member, determine a value associated with the respective non-equity contributing member based on the base EBITDA associated with the respective non-equity contributing member, and display, on the display, the value, if any, associated with the respective non-equity contributing member in a respective tenth cell of the one or more graphical user interfaces. Following each of the one or more first periodic intervals, and for each of one or more non-equity contributing members, the processor may determine a first current EBITDA associated with the respective non-equity contributing member, determine a bonus payout to the respective non-equity contributing member based on a difference between the first current EBITDA associated with the respective non-equity contributing member and the base EBITDA associated with the respective non-equity contributing member, display, on the display, the bonus payout to the respective non-equity contributing member in a respective eleventh cell of the one or more graphical user interfaces that shares a third column or row with the respective tenth cell of the one or more graphical user interfaces, and process, for payment, the bonus payout to the respective non-equity contributing member. Following the sale of the company, and for each of one or more non-equity contributing members, the processor may determine a second current EBITDA associated with the respective non-equity contributing member, determine a sale payout to the respective non-equity contributing member based on the second current EBITDA associated with the respective non-equity contributing member, where the sale payout to the respective non-equity contributing member comprises one or more multiples of the second current EBITDA associated with the respective non-equity contributing member, display, on the display, the sale payout to the respective non-equity contributing member in a respective twelfth cell of the one or more graphical user interfaces that shares the third column or row with the respective tenth cell of the one or more graphical user interfaces, and process, for payment, the sale payout to the respective non-equity contributing member.

According to a second example, a system may include a first apparatus having a display, a memory, and one or more processors communicatively coupled to the memory. For each of one or more founding members of a company that includes one or more healthcare practices, the processors may determine a value associated with the respective founding member, display, on the display, the value associated with the respective founding member in a respective first portion of one or more graphical user interfaces, determine a number of shares in the company owned by the respective founding member, and display, on the display, the number of shares in the company owned by the respective founding member in a respective second portion of the one or more graphical user interfaces that shares a first column or row with the respective first portion of the one or more graphical user interfaces. Following a sale of the company, and for each of one or more founding members of the company, the processors may determine a sale payout to the respective founding member based on the number of shares in the company owned by the respective founding member, and display, on the display, the sale payout to the respective founding member in a respective third portion of the one or more graphical user interfaces that shares the first column or row with the respective first portion of the one or more graphical user interfaces. For each of one or more equity contributing members of the company, the processors may determine a value associated with the respective equity contributing member, where the value associated with the respective equity contributing member is based on a base EBITDA associated with the respective equity contributing member, display, on the display, the value associated with the respective equity contributing member in a respective fourth portion of the one or more graphical user interfaces, determine a number of shares in the company owned by the respective equity contributing member, and display, on the display, the number of shares in the company owned by the respective equity contributing member in a respective fifth portion of the one or more graphical user interfaces that shares a second column or row with the respective fourth portion of the one or more graphical user interfaces. Following each of one or more first periodic intervals, and for each of one or more equity contributing members of the company, the processors may determine a first current EBITDA associated with the respective equity contributing member, determine a bonus payout to the respective equity contributing member based on a difference between the first current EBITDA associated with the respective equity contributing member and the base EBITDA associated with the respective equity contributing member, and display, on the display, the bonus payout to the respective equity contributing member in a respective sixth portion of the one or more graphical user interfaces that shares the second column or row with the respective fourth portion of the one or more graphical user interfaces. Following the sale of the company, and for each of one or more equity contributing members of the company, the processors may determine a sale payout to the respective equity contributing member based on the number of shares in the company owned by the respective equity contributing member, display, on the display, the sale payout to the respective equity contributing member in a respective seventh portion of the one or more graphical user interfaces that shares the second column or row with the respective fourth portion of the one or more graphical user interfaces. For each of one or more non-equity contributing members of the company, the processors may determine a base EBITDA associated with the respective non-equity contributing member, determine a value associated with the respective non-equity contributing member based on the base EBITDA associated with the respective non-equity contributing member, and display, on the display, the value, if any, associated with the respective non-equity contributing member in a respective eighth portion of the one or more graphical user interfaces. Following each of the one or more first periodic intervals, and for each of one or more non-equity contributing members of the company, the processors may determine a first current EBITDA associated with the respective non-equity contributing member, determine a bonus payout to the respective non-equity contributing member based on a difference between the first current EBITDA associated with the respective non-equity contributing member and the base EBITDA associated with the respective non-equity contributing member, and display, on the display, the bonus payout to the respective non-equity contributing member in a respective ninth portion of the one or more graphical user interfaces that shares a third column or row with the respective eighth portion of the one or more graphical user interfaces. Following the sale of the company, and for each of one or more non-equity contributing members of the company, the processors may determine a second current EBITDA associated with the respective non-equity contributing member, determine a sale payout to the respective non-equity contributing member based on the second current EBITDA associated with the respective non-equity contributing member, where the sale payout to the respective non-equity contributing member comprises one or more multiples of the second current EBITDA associated with the respective non-equity contributing member, and display, on the display, the sale payout to the respective non-equity contributing member in a respective tenth portion of the one or more graphical user interfaces that shares the third column or row with the respective eighth portion of the one or more graphical user interfaces.

According to a third example, a computational system includes a first apparatus having a display, memory and one or more processors capable of determining the value of all classes of members within the company including individual founders' shares, founding equity owners' shares, equity owners' shares and non-equity contributing members' award units, and referral award payments for any entity within or external to the company. The system further determines the various member's periodic EBITDA (earnings before interest, taxes, depreciation and amortization) earned, compares that to a base EBITDA determined when the member joined the company and determines a periodic bonus payment based on the growth of EBITDA of the member's current period relative to the base period EBITDA. The system further determines the payout of each member and/or entity when the company is sold awarding various EBITDA multiples of the sale proceeds to the different classes of members including founders, equity founders, equity members, non-equity members and referral entities based on their equity ownership percentage, predetermined EBITDA multiples or other preset payout guidelines.

BRIEF DESCRIPTION OF THE FIGURES

For a more complete understanding of the present disclosure and one or more examples of the features and advantages of the present disclosure, reference is now made to the following description, taken in conjunction with the accompanying drawings, in which:

FIG. 3 illustrates one example of the display output on a graphical user interface.

DETAILED DESCRIPTION

Figure 1:
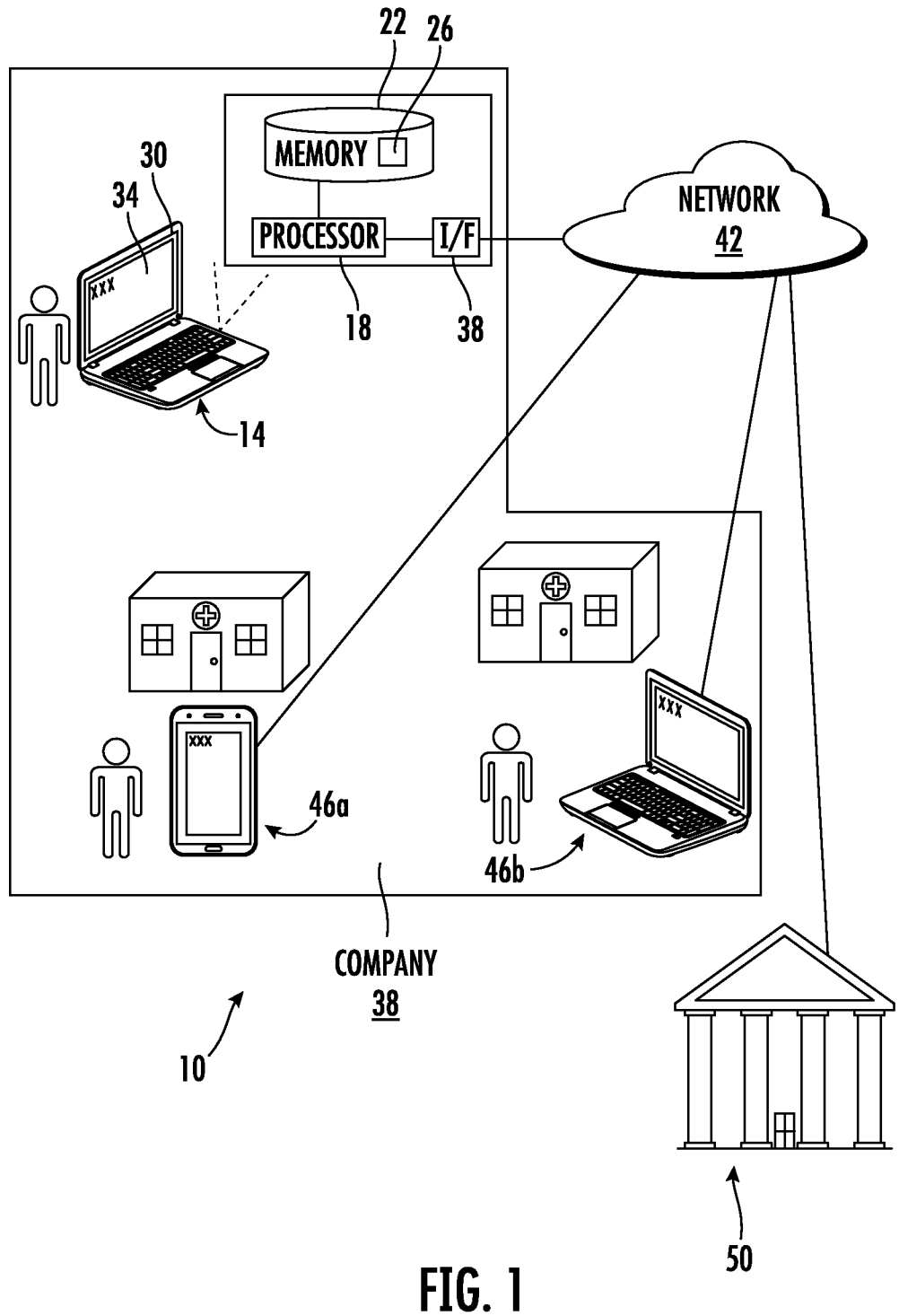
FIG. 1 illustrates an example system that utilizes a display tool.
Figure 2:
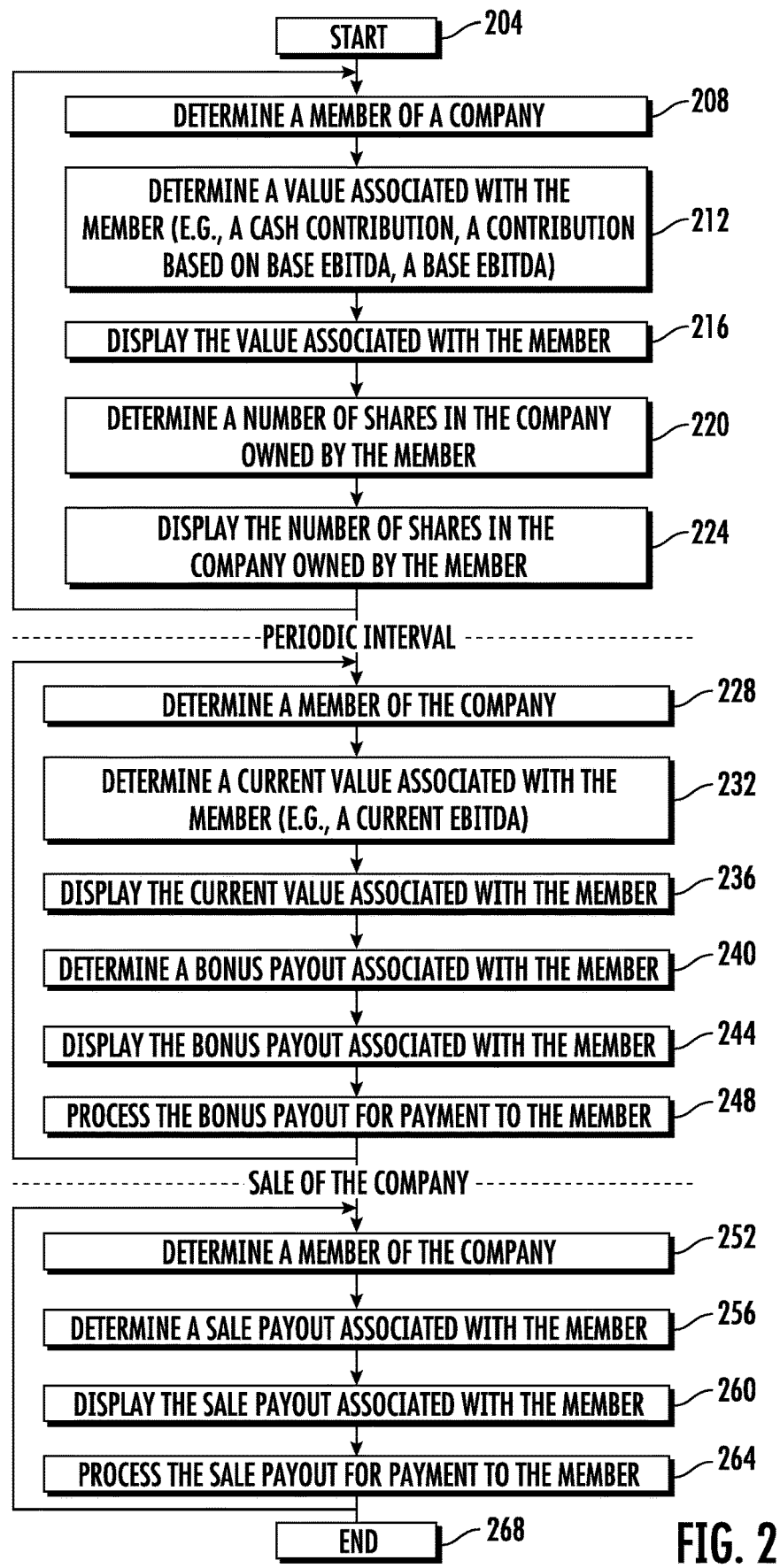
FIG. 2 illustrates an example implementation of the display tool of FIG. 1.

Examples in the present disclosure are best understood by referring to FIGS. 1-3 of the drawings, like numerals being used for like and corresponding parts of the various drawings.

In a variety of industries, it is standard practice for companies to provide information about the company in the form of multi-page paper or electronic documents distributed periodically. For example, investors in the company commonly receive information about their account in large paper or electronic documents that are distributed quarterly. However, such documents (which may be viewed via graphical user interfaces) tend to be quite complex, given the large volume of data to which they provide access. Additionally, such documents tend to only be updated on a periodic basis, which can render the information stale.

This disclosure contemplates a display tool that addresses one or more of the above issues. While this disclosure contemplates the use of the display tool in any industry, for ease of explanation and understanding but not by way of limitation, this disclosure describes the tool as implemented for the medical industry, and in particular, in a healthcare network (e.g., private healthcare network) in any medical specialty in the medical industry, such as interventional pain management, orthopedics, cardiology, etc.

As one example, the display tool may be implemented in the incorporation, day-to-day running, and/or sale of a collection of various healthcare practices (e.g., physician healthcare practices) organized into a single company. Such an implementation simplifies the process by which a company incorporates, runs, and/or sells the collection of various healthcare practices, in some examples. Rather than requiring a member or administrator of the company to search through multiple complex documents stored at a variety of locations, the display tool provides the member or administrator with any information they may want to know about the company (or any of the various healthcare practices) directly from a graphical user interface, in some examples. Additionally, the information may be provided in a simplified and easily understood configuration, in some examples. Also, the graphical user interface may be updated continuously, in some examples, which may prevent the information from going stale.

FIG. 1 illustrates an example system 10 that utilizes a display tool 14. In the example illustrated in FIG. 1, system 10 includes a display tool 14, one or more networks 42, one or more member tools 46, and one or more financial institutions 50. Generally, the display tool 14 accesses information associated with a company, and then presents this information to an administrator in the form of a graphical user interface 34 displayed on display 30. Example details of the graphical user interface 34 are discussed below. All or a portion of the graphical user interface 34 may be transmitted for presentation to the member tools 46 (so as to be viewed by a member of the company), in some examples. Additionally, where the data in the graphical user interface 34 is associated with one or more payments, the display tool 14 may process the payments for distribution to the members (e.g., via one or more financial institutions 50).

In the example illustrated in FIG. 1, the system 10 includes the display tool 14. The display tool 14 may be any device that receives data, stores data, transmits data, and/or presents data for display to a user. For example, the display tool 14 may be (or may include) a personal computer, a laptop, a computer tablet, an iPad™, a mobile telephone (such as a Smartphone), an electronic notebook, a personal digital assistant, a host computer, a workstation, a web server, a network server, any suitable remote server, a mainframe, a file server, any other computing or processing device, any other device for receiving data, storing data, transmitting data, and/or presenting data for display to a user, or any combination of the preceding. The functions of the display tool 14 may be performed by any suitable combination of one or more servers or other components at one or more locations. In an example where the display tool 14 is a server, the server may be a private server, and the server may be a virtual or physical server. The server may include one or more servers at the same or remote locations. Also, the display tool 14 may be (or may include) any suitable component that functions as a server. In the example illustrated in FIG. 1, the display tool 14 is a laptop. Furthermore, in the example illustrated in FIG. 1, the display tool 14 includes a computer/data processor 18 and data storage medium 22 (e.g., memory) comprising instructions 26 executable by the processor 18 to perform the functions of the display tool 14, a display 30 that may present data for display to a user (e.g., on a graphical user interface 34 displayed on the display 30), and a communication port 38 (e.g., receiver, transmitter, transceiver, network interface) configured to receive and transmit data (e.g., receive requests for data, transmit data). Further example details of display tool 14 and/or its components are discussed below.

In the example illustrated in FIG. 1, the display tool 14 is associated with a company 38. In some examples, the company 38 may be (or may include) a collection of one or more healthcare practices, such as one or more interventional pain management healthcare practices. Each healthcare practice may have its own owner(s), staff and other personnel, client(s), value (e.g., earnings before interest, taxes, depreciation and amortization (EBITDA)), taxes, inventory, lease(s), real estate assets, profit and loss, billing information, insurance information, bonus structure(s), and any other business related items and/or information. All of this information, for each healthcare practice, may need to be tracked, in some examples. Furthermore, if the company 38 is ever sold, profits and/or payments may need to be determined and paid out to various members and/or associates of the company 38 (and/or of one or more of the healthcare practice(s)). To allow the company 38 to keep track of this, the display tool 14 may access, collect, and/or determine this information and present it to an administrator to view (e.g., in a single graphical user interface 34, in multiple graphical user interfaces 34) on the display 30. The administrator may refer to any user that is authorized to view the information displayed on display 30, in some examples. For example, the administrator may refer to an employee of the company 38, an owner of the company 38, a board of director of the company 38, an accountant or lawyer of the company 38, any other user that is authorized to view the information displayed on display 30, or any combination of the preceding.

In the example illustrated in FIG. 1, the system 10 also includes one or more networks 42. The network 42 represents any suitable network operable to facilitate communication between the components of system 10, such as display tool 14, member tools 46, and financial institutions 50. The network 42 may include any interconnecting system capable of transmitting audio, video, signals, data, information, messages, or any combination of the preceding. The network 42 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, any other suitable communication link, including combinations thereof, operable to facilitate communication between the components of system 10, or any combination of the preceding.

In the example illustrated in FIG. 1, the system 10 further includes one or more member tools 46. The member tool 46 may be any device that receives data, stores data, transmits data, and/or presents data for display. For example, the display tool 14 may be (or may include) a personal computer, a laptop, a mobile telephone (such as a Smartphone), an electronic notebook, a personal digital assistant, a host computer, a workstation, any other computing or processing device, any other device for receiving data, storing data, transmitting data, and/or presenting data for display to a user, or any combination of the preceding. In the example illustrated in FIG. 1, the member tool 46a is a Smartphone and the member tool 46b is a laptop.

In the example illustrated in FIG. 1, each member tool 46 is associated with a member of the company 38. Example of member(s) are discussed in further detail below. The member tool 46 may allow the member to receive and view all or a portion of the information discussed above with regard to the display tool 14. For example, the member tool 46 may allow the member to receive and view all or a portion of the EBITDA of one or more healthcare practices, bonus payout information for one or more healthcare practices, payments that have been determined (and are to be paid out) for one or more healthcare practices, any other information accessed, collected, and/or determined by the display tool 14, or any combination of the preceding. If a member is associated with a particular healthcare practice (e.g., the member is an owner of the healthcare practice), the member tool 46 of that member may only be able to receive and view information associated with that particular healthcare practice, in some examples.

In the example illustrated in FIG. 1, the system 10 further includes one or more financial institutions 50. The financial institution 50 may refer to a company engaged in the business of dealing with financial and monetary transactions such as deposits, loans, investments, and currency exchange. Examples of a financial institution 50 may include a commercial bank, a thrift, a credit union, any other company engaged in the business of dealing with financial and monetary transactions, or any combination of the preceding. In the example illustrated in FIG. 1, the display tool 14 (and/or administrator) may communicate with one or more financial institutions 50 in order to process one or more payments. For example, a particular financial institution 50 may be the commercial bank of a particular healthcare practice associated with a particular member. In such an example, the display tool 14 may communicate with this financial institution 50 in order to process or make a payment (e.g., via a wire, online transaction) to that particular member.

Modifications, additions, or omissions may be made to system 10 without departing from the scope of the disclosure. For example, system 10 may include any number of display tools 14, networks 42, member tools 46, and/or financial institutions 50 (and/or any number of components, such as processors or memory units illustrated or described in the above devices). System 10 may also include within its network or networks, connections to private and/or public healthcare insurance companies, patients and governmental healthcare agencies that process medical claims for payment to the member healthcare practices of the network. Also, any suitable logic may perform the functions of system 10 and the components and/or devices within system 10. Furthermore, one or more components of system 10 may be separated, combined, and/or eliminated.

As is discussed above, this disclosure contemplates the use of the display tool 14 in any industry. For ease of explanation and understanding but not by way of limitation, one example of the implementation of the display tool 14 may include being implemented in the incorporation, day-to-day running, and/or sale of a collection of various healthcare practices organized into a single company 38.

The company 38 may provide a financial benefit for smaller practices by consolidating and affiliating multiple, smaller healthcare practices with the company 38, which may organize and own the financial cash flow of the healthcare practices. In some examples, the company 38 may have full financial ownership of each of the healthcare practices. The company 38 may create financially attractive contractual relationships between the company 38 and the healthcare practices for end-of-career stages of the practicing providers at the healthcare practices. The attractive financial relationship may provide an improved financial payback for the healthcare practices commensurate with the higher value of the company 38 rather than individual sale of the individual healthcare practices at lower valuations. The reasoning for this is that the financial return on a small healthcare practice (e.g., with EBITDA less than $5 million) is simply not sufficient to justify all the work and expense of the acquisition. As such, many healthcare practices are too small to be acquired by the larger healthcare companies or strategies (e.g., HCA Healthcare, Cardinal Health, etc.) and/or private equity firms. However, when these smaller healthcare practices are consolidated into one larger company (e.g., company 38), then the financials of a buy-out become much more attractive to the healthcare practices and to the purchaser.

In some examples, the company 38 may include (e.g., via acquisition and/or integration) one or more healthcare practices so as create a critical mass of common healthcare practices that are, when combined, sufficiently profitable to attract the interest of larger healthcare companies in either the public, private or private equity sectors as buyers of the company 38. The entire company 38 (including each of the healthcare practices) may be sold.

To create this combination of healthcare practices, the company 38 may not purchase the healthcare practices. Instead, in some examples, financial incentives at various levels may be provided to the healthcare practices (with little to no cash outlay by the company 38 or the healthcare practices). Examples of such financial incentives include a payout at the sale of the company 38 (e.g., a "second retirement" payout), bonus payment(s) for growing the healthcare practice (e.g., a bonus payment for growth EBITDA), and a salary (e.g., a salary to a member for continuing to work at the healthcare practice). The financial incentives may be based on the type of membership in the company. For example, the company 38 may include one or more of the following members/entities: (a) founding members; (b) equity contributing members; (c) non-equity contributing members with excess EBITDA; (d) non-equity contributing members with no excess EBITDA; and (e) referring entities. Examples of each of these members/entities are discussed below.

A founding member may refer to a member (e.g., person, company, or other entity) that contributes money or their healthcare practice to the company 38 at the time of the formation of the company 38. A founding member has equity in the company 38. In one example, this equity is based on the founding member's equity ownership shares in the company 38, which may be determined based on the value of contribution by the founding member at a current price per share in the company 38 at the time of formation. When contributing their healthcare practice, the contribution may be valued via Enterprise Value/Earnings Before Interest, Taxes, Depreciation and Amortization (EV/EBITDA) multiple consistent with other private equity valuations for similar sized practices. In some examples, financial incentives to the founding member may include a payout at sale of the company 38 (based on a number of equity shares owned). Other example financial incentives to the founding member may also include a salary for work performed at the company 38 (or the founding member's healthcare practice) and/or a bonus payout for growth EBITDA of the founding member's healthcare practice. Examples of a founding member in FIG. 1 include an administrator (utilizing the display tool 14) or a member (utilizing a member tool 46).

An equity contributing member may refer to a member (e.g., person, company, or other entity) that is not a founding member and that contributes both (a) their healthcare practice to the company 38, and (b) the base EBITDA of their healthcare practice to the company 38 every year (where the base EBITDA refers to the EBITDA (e.g., operating EBITDA) of the healthcare practice as determined in the last trailing twelve months prior to joining the company 38 (e.g., TTM EBITDA)). An equity contributing member has equity in the company 38. In one example, this equity is based on the equity contributing member's equity ownership shares in the company 38, which may be determined based on the value of contribution by the equity contributing member at the current value of the company 38 (i.e., a current price per share in the company 38) at the time of joining the company 38. As one example of this, an equity contributing member's healthcare practice may have an EBITDA of $500,000, and the term may be for 5 years (before the company 38 is sold). In such an example, the value of the contribution may be determined to be $2.5 million (i.e., $500,000 times 5). In some examples, instead of (or in addition to) contributing their healthcare practice, the equity contributing member may contribute money to the company. In some examples, financial incentives to the equity contributing member may include a payout at the sale of the company 38 (based on number of equity shares owned). In some examples, an equity share owned by the equity contributing member may have a different value than an equity share owned by a founding member. Other example financial incentives to the equity contributing member may also include a salary for work performed at the equity contributing member's healthcare practice and/or a bonus payout for growth EBITDA of the equity contributing member's healthcare practice. Examples of an equity contributing member in FIG. 1 include a member (utilizing a member tool 46).

A non-equity contributing member with excess positive EBITDA may refer to a member (e.g., person, company, or other entity) that contributes their healthcare practice to the company 38, and has excess positive base EBITDA (where excess base EBITDA correlates to Net Equity, which is a value that occurs when there is a net positive base EBITDA after all owners are paid) but chooses not to contribute this excess base EBITDA to the company 38. Such a non-equity contributing member with excess EBITDA is referred to herein as a first non-equity contributing member. Because the first non-equity contributing member does not contribute the excess base EBITDA to the company 38, the excess base EBITDA is kept in an account for the first non-equity contributing member. This excess base EBITDA may be accessed and used by the first non-equity contributing member, and it is not available to the company 38, in some examples. However, during the final year before the sale of the company 38, the excess base EBITDA of the first non-equity contributing member during that final year is contributed to the company 38, and is no longer available to the first non-equity contributing member. The first non-equity contributing member does not have equity in the company 38. Instead, the first non-equity contributing member is eligible for a payout at the sale of the company 38. Examples of this payout are discussed in detail below. In some examples, financial incentives to the first non-equity contributing member may include this payout at the sale of the company 38. Other example financial incentives to the first non-equity contributing member may also include a salary for work performed at the first non-equity contributing member's healthcare practice and/or a bonus payout for growth EBITDA of the first non-equity contributing member's healthcare practice. Examples of a first non-equity contributing member in FIG. 1 include a member (utilizing a member tool 46).

A non-equity contributing member with no excess positive EBITDA may refer to a member (e.g., person, company, or other entity) that contributes their healthcare practice to the company 38, but has no excess base EBITDA (where no excess base EBITDA occurs when there is a net neutral or negative base EBITDA after all owners are paid). Such a non-equity contributing member with no excess EBITDA is referred to herein as a second non-equity contributing member. The second non-equity contributing member does not have equity in the company 38. Instead, the second non-equity contributing member is eligible for a payout at the sale of the company 38. Examples of this payout are discussed in detail below. In some examples, financial incentives to the second non-equity contributing member may include this payout at the sale of the company 38. Other example financial incentives to the second non-equity contributing member may also include a salary for work performed at the second non-equity contributing member's healthcare practice (e.g., a limited salary, such as limited to $500,000 per year for a registered MD or DO Physician) and/or a bonus payout for growth EBITDA of the second non-equity contributing member's healthcare practice. Examples of a second non-equity contributing member in FIG. 1 include a member (utilizing a member tool 46).

A referring entity may refer to a person, company, or other entity that refers one or more healthcare practices to the company 38 (and which are then acquired, integrated, or otherwise included in the company 38). For example, a referring entity may refer to an individual person, contractor, or consultant not affiliated or employed by a member company or a founding owner's company that refers one or more healthcare practices to the company 38 (and which are then acquired, integrated, or otherwise included in the company) or a referring entity may refer to a member company where employees, officers or owner(s) of a member company refer one or more healthcare practices to the company 38 (and which are then acquired, integrated, or otherwise included in the company 38). The referring entity does not have equity in the company 38, and also does not include one or more of the rights of the members in the company 38. Instead, the referring entity is eligible for a payout at the sale of the company 38. Examples of this payout are discussed in detail below. In some examples, financial incentives to the referring entity may include this payout at the sale of the company 38. In some examples, a referring entity may not be an actual member of the company 38. Instead, the referring entity may be an entity that works with the company 38 by referring one or more healthcare practices to the company 38. In some examples, a referring entity may be both a referring entity and a member of the company 38. For example, a referring entity may be a founding member who has also referred one or more healthcare practices to the company 38. In such an example, the referring entity is both a founding member and a referring entity.

As is discussed above, the company 38 may include (e.g., via acquisition and/or integration) one or more healthcare practices. As a result of this, National Provider Identifier (NPI) numbers of each of these healthcare practices is assigned to the company 38, in some examples. In such examples, the company 38 will bill all patients and payers, such as private commercial insurance, Medicare/Medicaid, Workman's Compensation insurance, Personal Injury claims including those being prosecuted by a legal firm, etc., for services provided by each healthcare practice, and the company 38 may process and collect the payments on behalf of each healthcare practice. Distributions may be made by the company 38 to each healthcare practice (e.g., so the healthcare practice can pay employees, rent, and other business expenses). In some examples, one or more nominal fee percentages may be paid (or retained) by the company 38 for billing services provided by the company 38, accounting services provided by the company 38, human resources services provided by the company 38, credentialing services provided by the company 38, marketing services provided by the company 38, salaries paid by the company 38 (e.g., salaries paid to members), all other back-office services provided by the company 38 and optionally contracted by each healthcare practice, any other expenses, or any combination of the preceding. Some of these services may be optional to a particular healthcare practice, in some examples. The purpose of these optional services is to help the healthcare practice grow its business (resulting in growth EBITDA in excess of the base EBITDA), which can result in bonus payouts to the associated member for growth EBITDA (e.g., at regular periodic intervals). This help may be provided by employees of the company 38, which is paid for by the nominal fees, any contributed EBITDAs by equity contributing member companies (discussed above), and a portion of the growth EBITDA for all equity and non-equity contributing member companies.

FIG. 2 illustrates an example method 200 of implementation of the display tool 14 of FIG. 1. In the illustrated example, each of the steps of method 200 are performed by the display tool 14 (e.g., performed by the processor(s) 18 of the display tool 14). In other examples, one or more of the steps of method 200 may be performed by any other device (e.g., any other device of FIG. 1) or entity. Additionally, for ease of explanation and understanding but not by way of limitation, method 200 is described below with regard to the incorporation, day-to-day running, and/or sale of a collection of various healthcare practices organized into company 38. However, this disclosure contemplates the use of the display tool 14 in any industry.

The method 200 starts at step 204. At step 208, a member of the company 38 (or other entity) is determined. In some examples, the member of the company 38 (or other entity) may be determined to be: (a) a founding member; (b) an equity contributing member; (c) a first non-equity contributing member; (d) a second non-equity contributing members; or (e) a referring entity. The member of the company 38 (or other entity) may be determined in any manner. Furthermore, following the determination of the member at step 208, each of steps 212-224 of method 200 may then be performed for that determined member (or other determined entity).

At step 212, a value associated with the member of the company 38 (or other entity) is determined. The value that is determined may be different for each type of member of the company 38 (or other entity), in some examples.

For a founding member, the value that is determined may refer to a contribution provided by the founding member at the time of the formation of the company 38. This contribution may be in the form of money (e.g., a cash contribution) and/or in the form of a healthcare practice (e.g., when the founding member is an equity contributing founding member that contributes their healthcare practice). For a founding member contributing $500,000 cash and with a nominal share price of $1.00/share, a founding member will earn 500,000 shares in the company, in some examples. If the share price rises over time as the company grows and generates more EBITDA, then the price per share also rises and leads to a capital return for the founding member.

For a founding member who contributes their healthcare practice (an equity contributing founding member), the value may refer to the value of the healthcare practice. For example, the contribution may be valued via Enterprise Value/Earnings Before Interest, Taxes, Depreciation and Amortization (EV/EBITDA) multiple consistent with other private equity valuations for similar sized practices. As one example of this, if the healthcare practice has a base EBITDA of $3,000,000 (where the base EBITDA refers to the EBITDA of the healthcare practice as determined in the last trailing twelve months prior to formation of the company 38 (e.g., TTM EBITDA)) and a commensurate EV/EBITDA multiple value for a profitable healthcare company of this size is 6 (where the commensurate EV/EBITDA multiple value may be determined in any manner), the value of contribution of the healthcare practice may be determined to be $18,000,000 (i.e., $3,000,000 times 6).

For an equity contributing member, the value that is determined may refer to a contribution provided by the equity contributing member at the time the equity contributing member joins the company 38. This contribution may be in the form of money (e.g., a cash contribution) and/or in the form of a healthcare practice (e.g., the equity contributing member contributes their healthcare practice). For the healthcare practice, the contribution may be valued via Enterprise Value/Earnings Before Interest, Taxes, Depreciation and Amortization (EV/EBITDA) multiple consistent with other private equity valuations for similar sized practices. As one example of this, if the healthcare practice has a base EBITDA of $1,000,000 (where the Base EBITDA refers to the EBITDA of the healthcare practice as determined in the last trailing twelve months prior to joining the company 38 (e.g., TTM EBITDA)) and the term of the company 38 is 5 years (e.g., 5 years until the sale of the company 38), and the commensurate multiple EV/EBITDA value is 5, the value of contribution of the healthcare practice may be determined to be $5,000,000 (i.e., $1,000,000 times 5).

For a first non-equity contributing member or a second non-equity contributing member, the value that is determined may refer to the base EBITDA of the healthcare practice (where the base EBITDA refers to the EBITDA of the healthcare practice as determined in the last trailing twelve months prior to joining the company 38 (e.g., TTM EBITDA) and does not include any Owner(s)' salary amount(s)) multiplied by a commensurate multiple for the size of the healthcare practice that is joining company 38. As one example of this, the company of a first non-equity contributing member (e.g., First Non-Equity Contributing Member C of FIG. 3) may have an EBITDA of $500,000 and using a multiple of EV/EBITDA of 4, this member would have an initial valuation of $2,000,000. As another example of this, the company of a second non-equity contributing member (e.g., Second Non-Equity Contributing Member D of FIG. 3) has no EBITDA for the practice as all the cash remaining after all other expenses are paid is taken by the owner as cash compensation of the second non-equity contributing member, and as such, the EBITDA is zero. In this case, the initial value is zero. However, as is seen in FIG. 3, after the practice joins the company 38, the practice generates growth EBITDA of $150,000 in the first year and earns a bonus payout of $90,000. When the company 38 is sold, the Second Non-Equity Contributing Member D has generated $500,000 in EBITDA (e.g., TTM EBITDA) and earns $1,250,000 in sale proceeds (before expenses) calculated as 2.5 multiple times EBITDA to give $1,250,000 enterprise value before deducting transactional expenses and any respective liabilities and/or debts.

For a referring entity, the value that is determined may refer to the current EBITDA of the healthcare practice (as determined in the last trailing twelve months (e.g., TTM EBITDA)) that the referring entity referred to the company 38. In this example, if the referring entity referred both Non-Equity Contributing Members C and D, and the combined EBITDA (e.g., TTM EBITDA) of both Non-Equity Contributing Members C and D was $2,000,000 at sale of company 38, then referring entity would earn $1,000,000 or a 0.5 multiple of the combined EBITDA of all the referred member companies by a single referring entity.

Although EBITDA (e.g., operating EBITDA) is discussed above as the manner of valuing a contribution of a healthcare practice, in other examples, the value of a contribution of a healthcare practice may be determined in any other manner. For example, the value may be profits (e.g., gross, net) of the healthcare practice, revenue multiples, discounted free cash flow to equity or any other type of valuation of the healthcare practice.

Referring back to step 212, the value associated with the member may be determined in any manner. For example, the display tool 14 may calculate the value. As an example of this, for an equity contributing member, the display tool 14 may access one or more documents, statements, or other values of the healthcare practice (e.g., from a database, from profit and loss statements, from tax documents), and the display tool 14 may then calculate the base EBITDA using the accessed information. In other examples, the display tool 14 may access the value directly from a database in order to determine the value, an administrator may input the value into the display tool 14 (e.g., input the value into a spreadsheet) so as to cause the display tool 14 to determine the value, the display tool 14 may determine the value in any other manner, or any combination of the preceding.

Following step 212, the method moves to step 216 where the value associated with the member is displayed. The display of the value (in step 216) may refer to the actual display of the value (e.g., the display 30 of the display tool 14 displaying the actual value), or it may refer to a processor causing the actual value to be displayed (e.g., the processor 18 of the display tool 14 causing the display 30 to display the actual value).

The value may be displayed in any manner. For example, as is discussed in FIG. 1, the value may be displayed in a graphical user interface 34 on the display 30 of the display tool 14. As such, an administrator using the display tool 14 may view the value. The value may be displayed on any portion of a graphical user interface 34. For example, the value may be displayed in a particular portion of the graphical user interface 34 (e.g., a cell found at a particular column and particular row of a spreadsheet, such as an EXCEL spreadsheet), and it may be displayed in a manner that identifies the value as being associated with the particular member. An example of the value associated with the member being displayed in a graphical user interface is illustrated in FIG. 3, as the values displayed in column 304.

At step 220, a number of shares owned by the member of the company 38 is determined. The number of shares that is determined may be different for each type of member of the company 38 in some examples.

For a founding member, the number of shares that is determined may be based on the value of contribution by the founding member (determined at step 212, for example) at a current price per share in the company 38 at the time of the formation of the company 38, in some examples. As an example, if the value of contribution by the founding member is $500,000, and the current price per share in the company 38 at the time of the formation of the company 38 is $1.00 per share, the number of shares owned by that founding member is 500,000. As another example, if the value of contribution by the founding member (e.g., an equity contributing founding member) is $18,000,000, and the current price per share in the company 38 at the time of the formation of the company 38 is $1.00 per share, the number of shares owned by that founding member is 18,000,000.

For an equity contributing member, the number of shares that is determined may be based on the value of contribution by the equity contributing member (determined at step 212, for example) at a current price per share in the company 38 at the time that the equity contributing member joins the company 38. As an example, if the value of contribution by the founding member is $5,000,000, and the current price per share in the company 38 at the time of the formation of the company 38 is $1.25 per share, the number of shares owned by that founding member is 4,000,000.

As is discussed above, only a founding member or an equity contributing member may own shares in the company 38, in some examples. In such examples, the number of shares determined for each of a first non-equity contributing member, a second non-equity contributing member, and a referring entity is zero, or step 220 and step 224 (discussed below) are skipped entirely for these members.

Referring back to step 220, the number of shares owned by the member may be determined in any manner. For example, the display tool 14 may calculate the value. As an example of this, for an equity contributing member, the display tool 14 may access the value of contribution by the member (e.g., from the determination made at step 212, or from one or more documents, statements, or other values of the healthcare practice), the display tool 14 may further access the appropriate price per share in the company 38 (e.g., from a database or a stock exchange), and then the display tool 14 may then calculate the number of shares owned by the member using the accessed information. In other examples, the display tool 14 may access the number directly from a database in order to determine the number, an administrator may input the number into the display tool 14 so as to cause the display tool 14 to determine the number, the display tool 14 may determine the number in any other manner, or any combination of the preceding.

Following step 220, the method moves to step 224 where the number of shares owned by the member is displayed. The display of the number (in step 224) may refer to the actual display of the number (e.g., the display 30 of the display tool 14 displaying the actual number), or it may refer to a processor causing the actual number to be displayed (e.g., the processor 18 of the display tool 14 causing the display 30 to display the actual number). The number may be displayed in any manner. For example, as is discussed in FIG. 1, the number may be displayed in a graphical user interface 34 on the display 30 of the display tool 14. As such, an administrator using the display tool 14 may view the number. The number may be displayed on any portion of a graphical user interface 34. For example, the number may be displayed in a particular portion of the graphical user interface 34 (e.g., a cell found at a particular column and particular row of a spreadsheet), and it may be displayed in a manner that identifies the number as being associated with the particular member. In some examples, the number of shares owned by the member may be displayed in the same particular column or the same particular row of a spreadsheet as the value of that particular member (in step 216). An example of the number being displayed in a graphical user interface is illustrated in FIG. 3, at reference number 308. An example of the number of shares owned by the member being displayed in a graphical user interface is illustrated in FIG. 3, as the numbers displayed in column 308.

In some examples, the determination and display steps of 220 and 224 may additionally (or alternatively) include a determination and display of a current value associated with the number of shares owned by the member. The determination and display of the current value may occur in a similar manner as that of the number of shares discussed above with regard to steps 220 and 224. An example of the current value associated with the number of shares owned by the member being displayed in a graphical user interface is illustrated in FIG. 3, as the values displayed in column 312.

Steps 208-224 of method 200 may be repeated for each member of the company 38 (or for any portion of the members of the company 38), as is illustrated by the return line. As a result of this, the value associated with a member, and the number of shares owned by the member (and the current value) may be displayed for each member of the company 38 (or for any portion of the members of the company 38). In some examples, this may result in a single graphical user interface 34 that includes all of this information for each member of the company 38 (or for any portion of the members of the company 38). In other examples, this information may be spread out over multiple graphical user interfaces 34 (e.g., one graphical user interface 34 for each member). Additionally, this information may be updated on a periodic basis (e.g., each year, each quarter, or any other periodic basis), in some examples. For example, the information may be updated each year for a term of five years, and the values and numbers for each year may be displayed in a portion of the graphical user interface (e.g., a new column and/or row), so that the changes can be easily viewed. In the updates, the value associated with a member (step 212) may be different from the previous value. For example, instead of a base EBITDA, the new value associated with the member may be a current EBITDA or any other value.

As is seen in FIG. 2, method 200 further includes one or more steps that occur following a periodic interval from the formation of the company 38. These steps include steps 228-248. The periodic interval may refer to any amount of time. For example, the periodic interval may be each year after the formation of the company 38, each six months after the formation of the company 38, each quarter after the formation of the company 38, or any other amount of time. In one example, the periodic interval is each year after the formation of the company 38. In such an example, method 200 may include steps 228-248 following each year (after the formation of the company 38) for each member of the company 38 (or for any portion of the members of the company 38).

At step 228, a member of the company 38 (or other entity) is determined. In some examples, the member of the company 38 (or other entity) may be determined to be: (a) a founding member; (b) an equity contributing member; (c) a first non-equity contributing member; (d) a second non-equity contributing members; or (e) a referring entity. The member of the company 38 (or other entity) may be determined in any manner. Furthermore, following the determination of the member at step 228, each of steps 232-248 of method 200 may then be performed for that determined member.

At step 232, a current value associated with the member of the company 38 (or other entity) is determined. The current value that is determined may be different for each type of member of the company 38, in some examples.

For members of the company 38 that have contributed their healthcare practice, the current value may be any type of current value of the healthcare practice, in some examples. For example, the current value may be the current EBITDA of the healthcare practice (where the current EBITDA refers to the EBITDA of the healthcare practice as determined in the last trailing twelve months (e.g., TTM EBITDA) prior to the periodic interval discussed above) multiplied by a commensurate EV/EBITDA multiple. The members of the company 38 that have contributed their healthcare practice refer to the founding members that have contributed their healthcare practice (equity contributing founding members), the equity contributing members that have contributed their healthcare practice, the first non-equity contributing members, and the second non-equity contributing members, in some examples.

Also, for members of the company 38 that have not contributed their healthcare practice (e.g., founding members that have only contributed money), or have only invested cash in the company 38, or are referring entities, the current value associated with the member/entity is zero, or steps 232-236 are skipped entirely for these members/entities, in some examples.

Referring back to step 232, the current value associated with the member may be determined in any manner. For example, the display tool 14 may calculate the value. As an example of this, for an equity contributing member, the display tool 14 may access one or more documents, statements, or other values of the healthcare practice (e.g., from a database, from profit and loss statements, from tax documents), and the display tool 14 may then calculate the current EBITDA using the accessed information. In other examples, the display tool 14 may access the value directly from a database in order to determine the value, an administrator may input the value into the display tool 14 so as to cause the display tool 14 to determine the value, the display tool 14 may determine the value in any other manner, or any combination of the preceding.

Following step 232, the method moves to step 236 where the current value associated with the member is displayed. The display of the value (in step 236) may refer to the actual display of the value (e.g., the display 30 of the display tool 14 displaying the actual value), or it may refer to a processor causing the actual value to be displayed (e.g., the processor 18 of the display tool 14 causing the display 30 to display the actual value). The value may be displayed in any manner. For example, as is discussed in FIG. 1, the value may be displayed in a graphical user interface on the display 34 of the display tool 14. As such, an administrator using the display tool 14 may view the value. The value may be displayed on any portion of a graphical user interface 34. For example, the value may be displayed in a particular portion of the graphical user interface 34 (e.g., a cell found at a particular column and particular row of a spreadsheet), and it may be displayed in a manner that identifies the value as being associated with the particular member. In some examples, the current value associated with the member may be displayed in the same particular column or the same particular row of a spreadsheet as the value of that particular member (from step 216). An example of the current value associated with the member being displayed in a graphical user interface is illustrated in FIG. 3, as the values displayed in column 316.

At step 240, a bonus payout value associated with the member of the company 38 is determined. The bonus payout value that is determined may be different for each type of member of the company 38, in some examples.

For members of the company 38 that have contributed their healthcare practice, the bonus payout value may be a value that is based on the current value associated with the member (determined at step 232) and the value associated with the member (determined at step 212), in some examples. As an example of this, the bonus payout value may be a portion of the difference between the current value associated with the member (determined at step 232) and the value associated with the member (determined at step 212), if the difference is a positive number. For illustrative purposes only, considering an equity contributing member, if the current value associated with the member (e.g., the current EBITDA times the multiple) is $6,250,000 and the value associated with the member is $1,250,000 and the base EBITDA is $1,000,000, the bonus payout value may be a portion of the $250,000 difference (where the $250,000 difference is defined as the Growth EBITDA). The portion may be any portion (e.g., 10%, 20%, 50%, 60%, 90%, or any portion greater than 0% and less than or equal to 100%). As one example of this, the portion is 60%, which in the example described above makes the bonus payout value be $150,000 (60% of the $250,000 difference). This bonus payout value is provided to the member, in some examples. In some examples, the bonus payout value may be paid to the member annually (or after any other periodic interval). Furthermore, the bonus payout value may encourage the member to continuously grow their healthcare practice even after joining the company 38. The remainder (e.g., 40% of the $100,000 difference for a total of $250,000) is provided back to the company 38, in some examples.

For members of the company 38 that have not contributed their healthcare practice, or have only invested cash in the company 38 or are referring entities, the bonus payout value associated with the member is zero, or steps 240-248 are skipped entirely for these members or entities, in some examples.

Referring back to step 240, the bonus payout value for a member may be determined in any manner. For example, the display tool 14 may calculate the value (examples of which are discussed above). In other examples, the display tool 14 may access the value directly from a database in order to determine the value, an administrator may input the value into the display tool 14 so as to cause the display tool 14 to determine the value, the display tool 14 may determine the value in any other manner, or any combination of the preceding.

Following step 240, the method moves to step 244 where the bonus payout value associated with the member is displayed. The display of the value (in step 244) may refer to the actual display of the value (e.g., the display 30 of the display tool 14 displaying the actual value), or it may refer to a processor causing the actual value to be displayed (e.g., the processor 18 of the display tool 14 causing the display 30 to display the actual value). The value may be displayed in any manner. For example, as is discussed in FIG. 1, the value may be displayed in a graphical user interface 34 on the display 30 of the display tool 14. As such, an administrator using the display tool 14 may view the value. The value may be displayed on any portion of a graphical user interface 34. For example, the value may be displayed in a particular portion of the graphical user interface 34 (e.g., a cell found at a particular column and particular row of a spreadsheet), and it may be displayed in a manner that identifies the value as being associated with the particular member. In some examples, the bonus payout value associated with the member may be displayed in the same particular column or the same particular row of a spreadsheet as the value of that particular member (from step 216). An example of the bonus payout value associated with the member being displayed in a graphical user interface is illustrated in FIG. 3, as the values displayed in column 320.

At step 248, the bonus payout value associated with the member is processed for payment. The bonus payout value may be processed for payment in any manner. For example, the display tool 14 may automatically cause a transfer of money (e.g., via a wire transfer, via an online transaction) from a financial institution 50 associated with the company 38 to a financial institution 50 associated with the member. In some examples, this automation may require approval from an administrator. In other examples, the display tool 14 may prompt the administrator to cause a transfer of money from a financial institution 50 associated with the company 38 to a financial institution 50 associated with the member, the display tool 14 may cause one or more checks for the money to be printed for signature and sending to the member, the display tool 14 may process the bonus payout value in any other manner, or any combination of the preceding.

Steps 228-248 of method 200 may be repeated for each member of the company 38 (or for any portion of the members of the company 38), as is illustrated by the return line. As a result of this, the current value associated with a member, and the bonus payout value may be displayed for each member of the company 38 (or for any portion of the members of the company 38). In some examples, this may result in a single graphical user interface 34 that includes all of this information (and the information from steps 212-224) for each member of the company 38 (or for any portion of the members of the company 38). In other examples, this information (and/or the information from steps 212-224) may be spread out over multiple graphical user interfaces 34 (e.g., one graphical user interface 34 for each member). Additionally, this information may be updated at each periodic interval (e.g., each year, each quarter, or any other periodic interval), in some examples. For example, the information may be updated each year for a term of five years, and the values for each year may be displayed in a new column and/or row, so that the changes can be easily viewed. An example of this updating is illustrated in FIG. 3, as the first year values being displayed in columns 316a and 320a, and the second year values being displayed in columns 316b and 320b. Additionally, these updates would continue for each year of the term of five years, in some examples. Examples of these additional updates are not illustrated in FIG. 3.

As is seen in FIG. 2, method 200 further includes one or more steps that occur following a sale of the company 38. These steps include steps 252-264. The sale of the company 38 refers to a sale of all (or substantially all) of the company 38, in some examples. In other examples, the sale of the company 38 refers to sale of all (or substantially all) of the healthcare practices included in company 38. In other examples, the sale of the company 38 refers to a sale (or other event that replaces the sale) approved by the board of directors of the company 38.

At step 252, a member of the company 38 (or other entity) is determined. In some examples, the member of the company 38 (or other entity) may be determined to be: (a) a founding member; (b) an equity contributing member; (c) a first non-equity contributing member; (d) a second non-equity contributing members; or (e) a referring entity. The member of the company 38 (or other entity) may be determined in any manner. Furthermore, following the determination of the member at step 252, each of steps 256-264 of method 200 may then be performed for that determined member (or that determined entity).

At step 256, a sale payout value associated with the member of the company 38 (or other entity) is determined. The sale payout value that is determined may be different for each type of member of the company 38 (or other entity), in some examples.

For a founding member, the sale payout value that is determined is based on the number of shares owned by the founding member (which is determined at step 220), in some examples. As an example of this, the founding member may own 500,000 shares in the company 38, which may equate to a 1.98% ownership of the company 38. In such an example, the sale payout value may be determined to be 1.98% of the net sale price of the company 38 (where the net sale price refers to the sale price of the company 38 after expenses (e.g., a pro rata share of expenses and liabilities) and sale payout values for the eligible non-equity members and eligible referring entities are paid out). In another example, the sale payout value may be determined to be 1.98% of the gross sale proceeds remaining after the first non-equity members, the second non-equity members and the referring entities are paid, in some examples. As a further example, the founding member may be an equity contributing founding member who owns 18,000,000 shares in the company 38, which may equate to a 71.23% ownership of the company 38. In such an example, the sale payout value may be determined to be 71.23% of the net sale price of the company 38 (where the net sale price refers to the sale price of the company 38 after expenses (e.g., a pro rata share of expenses and liabilities) and sale payout values for the eligible non-equity members and eligible referring entities are paid out).

For an equity contributing member, the sale payout value is based on the number of shares owned by the equity contributing member (which is determined at step 220), in some examples. As an example of this, the equity contributing member may own 4,000,000 shares in the company 38, which may equate to a 15.83% ownership of the company 38. In such an example, the sale payout value may be determined to be 15.83% of the net sale price of the company 38 (where the net sale price refers to the sale price of the company 38 after expenses (e.g., a pro rata share of expenses and liabilities) and sale payout values for the eligible non-equity members and eligible referring entities are paid out).

For a first non-equity contributing member, the sale payout value is based on a final current EBITDA associated with the member (where a final current EBITDA refers to the EBITDA of the member's healthcare practice as determined in the last trailing twelve months prior to the sale of the company 38 (e.g., TTM EBITDA)), in some examples. In some examples, the sale payout value for the first non-equity contributing member is based on a final current EBITDA associated with the member multiplied by some portion of the final sale EV/EBITDA multiple, in some examples. As one example of this, the sale payout value may be a multiple (e.g., 0.5 times, 2.5 times, 5 times, or any other multiple) of the final current EBITDA of the member's healthcare practice. In some examples, the multiple may additionally be based at least partly on the final sale price of the company 38. For example, if the final sale price is greater than a floor multiple of 5 times the current EBITDA (e.g., TTM EBITDA) of the company 38, the multiple may include a portion of the final sale price (e.g., the portion may be 50 percent of the difference between the multiple of the current enterprise value of the company 38 and 5.0, less 0.5 for the referral fee, if any). As an illustrative example only, assuming the first non-equity contributing member (e.g., First Non-Equity Member C from FIG. 3) was referred by the referring entity, where the final sale price of the company is 10 times the current EBITDA (e.g., TTM EBITDA) value of the company 38, the multiple may include 50% of the floor multiple plus an additional 50% of the remaining multiple less any referring multiple (i.e., where 50 percent of (10.0 minus 5.0 minus 0.5) is equal to 2.25) which is added to the floor multiple of 2.5 for a final multiple of 4.75 times the final current EBITDA for the non-equity contributing member at the time of sale. In some examples, the sale payout value may also take into account various expenses (e.g., a pro rata share of expenses and liabilities and any referral fees paid to the referring entities). For example, in the illustrative example, the net sale payout value may be 4.5 times the final current EBITDA of the member's healthcare practice, which accounts for deduction of a pro rata share of expenses for that member.

For a second non-equity contributing member, the sale payout value is based on a final current EBITDA associated with the member (where a final current EBITDA refers to the EBITDA of the member's healthcare practice as determined in the last trailing twelve months prior to the sale of the company 38 (e.g., TTM EBITDA)), in some examples. As one example of this, the sale payout value may be a multiple (e.g., 0.5 times, 2 times, 3 times, or any other multiple) of the final current EBITDA of the member's healthcare practice. As an illustrative example only, the sale payout value may be 2.5 times the final current EBITDA of the member's healthcare practice. In some examples, unlike the multiple for a first non-equity member, the multiple for the second non-equity contributing member may not include a portion of the sale price of the company 38. In some examples, the sale payout value may take into account various expenses (e.g., a pro rata share of expenses and liabilities and referral fees if any). For example, in the illustrative example, the sale payout value may be 2.5 times the final current EBITDA of the member's healthcare practice, minus a pro rata share of expenses for that member.

For a referring entity, the sale payout value is based on a final current EBITDA of the healthcare practice that the referring entity referred to the company (where a final current EBITDA refers to the EBITDA of the referred healthcare practice as determined in the last trailing twelve months prior to the sale of the company 38 (e.g., TTM EBITDA)). As one example of this, the sale payout value may be a multiple (e.g., 0.5 times, 2 times, 3 times, or any other multiple) of the final current EBITDA of the healthcare practice. As an illustrative example only, the sale payout value may be 0.5 times the final current EBITDA of the referred healthcare practice paid to the referring entity. In some examples, the sale payout value may take into account various expenses (e.g., a pro rata share of expenses and liabilities). For example, in the illustrative example, the sale payout value may be 0.5 times the final current EBITDA of the referred healthcare practice, minus a pro rata share of expenses for that member.

Referring back to step 256, the sale payout value for a member may be determined in any manner. For example, the display tool 14 may calculate the value (examples of which are discussed above). In other examples, the display tool 14 may access the value directly from a database in order to determine the value, an administrator may input the value into the display tool 14 so as to cause the display tool 14 to determine the value, the display tool 14 may determine the value in any other manner, or any combination of the preceding.

Following step 256, the method moves to step 260 where the sale payout value associated with the member is displayed. The display of the value (in step 260) may refer to the actual display of the value (e.g., the display 30 of the display tool 14 displaying the actual value), or it may refer to a processor causing the actual value to be displayed (e.g., the processor 18 of the display tool 14 causing the display 30 to display the actual value). The value may be displayed in any manner. For example, as is discussed in FIG. 1, the value may be displayed in a graphical user interface 34 on the display 30 of the display tool 14. As such, an administrator using the display tool 14 may view the value. The value may be displayed on any portion of a graphical user interface 34. For example, the value may be displayed in a particular portion of the graphical user interface 34 (e.g., a cell found at a particular column and particular row of a spreadsheet), and it may be displayed in a manner that identifies the value as being associated with the particular member. In some examples, the sale payout value associated with the member may be displayed in the same particular column or the same particular row of a spreadsheet as the value of that particular member (from step 216). An example of the sale payout value associated with the member being displayed in a graphical user interface is illustrated in FIG. 3, as the values displayed in column 324.

At step 264, the sale payout value associated with the member is processed for payment. The sale payout value may be processed for payment in any manner. For example, the display tool 14 may automatically cause a transfer of money (e.g., via a wire transfer, via an online transaction) from a financial institution 50 associated with the company 38 to a financial institution 50 associated with the member. In some examples, this automation may require approval from an administrator. In other examples, the display tool 14 may prompt the administrator to cause a transfer of money from a financial institution 50 associated with the company 38 to a financial institution 50 associated with the member, the display tool 14 may cause one or more checks for the money to be printed for signature and sending to the member, the display tool 14 may process the sale payout value in any other manner, or any combination of the preceding.

Steps 252-264 of method 200 may be repeated for each member of the company 38 (or for any portion of the members of the company 38), as is illustrated by the return line. As a result of this, the sale payout value may be displayed for each member of the company 38 (or for any portion of the members of the company 38). In some examples, this may result in a single graphical user interface 34 that includes all of this information (and the information from steps 212-248) for each member of the company 38 (or for any portion of the members of the company 38). In other examples, this information (and/or the information from steps 212-248) may be spread out over multiple graphical user interfaces 34 (e.g., one graphical user interface 34 for each member).

At step 268, the method 200 ends. Modifications, additions, or omissions may be made to method 200. For example, one or more steps of method 200 may be optional, or may not be performed. As one example of this, method 200 may not include the steps regarding processing of payments. As a further example, the steps of method 200 may be performed in parallel or in any suitable order.

In some examples, the method 200 may include further steps. For example, as is illustrated in FIG. 1, a member may utilize a member tool 46 to view one or more graphical user interfaces 34. In such examples, the method 200 may further includes steps regarding receiving, from a member tool 46, a request to view information, and transmitting the information for display on the member tool 46. Such steps may include authentication procedures, in some examples. Furthermore, as is discussed above with regard to FIG. 1, the member tool 46 may display all of the information displayed by the display tool 14, or it may only include a subset of the information. For example, a member tool 46 may only be able to access and display information associated with that particular member (and that particular member's healthcare practice).

As another example, the method 200 may further includes steps regarding: (a) determining and displaying fees paid by the member (e.g., for billing services provided by the company 38 or its affiliate company, accounting services provided by the company 38, human resources services provided by the company 38, credentialing services provided by the company 38, marketing services provided by the company 38, all other back-office services provided by the company 38 or its affiliate); (b) determining and displaying billing information (to patients and payers); (c) determining and displaying distributions made to the healthcare practice of the member; (d) determining and displaying salaries paid to the member (and other eligible employees of the healthcare practice); (e) determining and displaying graphs or other illustrations related to the information determined in method 200 (e.g., a graph showing the growth EBITDA of one or more healthcare practices over multiple years); (f) determining and displaying the Net Equity of the first non-equity contributing member(s) along with providing access to the Net Equity (e.g., via payments to the first non-equity contributing member) and continuously tracking it; (g) providing links to various documents (e.g., original agreement signed by a member, documents showing the details of EBITDA calculations) that can be clicked on by a member so the member can view them; (h) displaying any of the information used to make the determinations in method 200 (e.g., displaying the multiple used determine the sale payout value for a non-equity contributing member, displaying the final current EBITDA used to determine the sale payout value for a non-equity contributing member, etc.); (i) providing any other information associated with the company 38, the members, and the healthcare practices; or (j) any combination of the preceding.

FIG. 3 illustrates one example of the display output on a graphical user interface 34. In the illustrated example, the graphical user interface 34 of FIG. 3 includes the following members/entities: (a) a Founding Member A that contributes cash only, and an Equity Contributing Founding Member A that contributes a healthcare practice to company 38, where the Founding Member A and the Equity Contributing Founding Member A may be separate entities or a single entity; (b) an Equity Contributing Member B that contributes a healthcare practice, or that contributes cash only, or that contributes both; (c) a First Non-Equity Contributing Member C; (d) a Second Non-Equity Contributing Member D; and (e) a Referring Entity E. However, the graphical user interface 34 may include any number of members/entities, and/or any number of the types of members/entities contributing cash and/or equity from a contributed healthcare practice. The graphical user interface 34 of FIG. 3 further includes examples of the displayed information from FIG. 2. However, the graphical user interface 34 may include any other information, and the information may be arranged in any other manner. Furthermore, although FIG. 3 illustrates the information being displayed on only a single graphical user interface 34, the information may be displayed on any number of graphical user interfaces 34 (e.g., a graphical user interface 34 for each member).

In various examples, the herein described systems (e.g., system 10), devices (e.g., display tool 14, member tool 46), components of the devices, and methods may be implemented in software, firmware, or executable instructions stored in a data storage medium such as or including machine-readable medium. The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. Some examples may be implemented using a machine-readable medium or article which may store an instruction or a set of instructions that, if executed by a machine, may cause the machine to perform a method and/or operations in accordance with the examples. Such a machine may include, for example, any suitable processing platform, computing platform, computing device, processing device, computing system, processing system, computer, processor, or the like, and may be implemented using any suitable combination of hardware and/or software. Computers and computer systems described herein (e.g., display tool 14, member tool 46) may include operatively associated computer-readable memory media such as memory for storing software applications and instructions used in obtaining, processing, storing or communicating data. It can be appreciated that such memory can be internal, external, remote or local with respect to its operatively associated computer or computer system. Memory may also include any manner of storing software or other instructions including, for example and without limitation, solid state RAM storage, a hard disk, an optical disk, floppy disk, DVD, compact disc, memory stick, flash drive, compact disc flash drive, ROM (read only memory), RAM (random access memory), PROM (programmable ROM), EEPROM (extended erasable PROM), or other like computer-readable media. The machine-readable medium or article may include, for example, any suitable type of memory unit, memory device, memory article, memory medium, storage device, storage article, storage medium and/or storage unit, for example, memory, removable or non-removable media, solid state random access media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disk (DVD), a tape, a cassette, or the like.

It will be further apparent to one of ordinary skill in the art that some of the examples as described hereinabove may be implemented in many different examples of instruction (e.g., software or firmware) and hardware. The instructions may include any suitable type of code, such as source code, compiled code, interpreted code, executable code, static code, dynamic code, and the like. The actual software code or specialized control hardware used to implement some of the illustrated examples do not limit the present disclosure. The instructions may be implemented, for example, using any suitable programing language, which may include high-level, low-level, object-oriented, visual, compiled or interpreted programming languages, such as, but not limited to, C, C++, C#, Java, BASIC, SQL, Perl, Matlab, Pascal, Visual BASIC, Go, Python, R, Java Script, Typescript, Objective C, Swift, assembly language, machine code, and so forth. The examples are not limited in this context.

The methods (e.g., method 200), systems (e.g., system 10), devices (e.g., display tool 14, member tool 46), and components of the devices have been illustrated and described herein as comprising several separate functional elements, such as modules or units. Although certain of such modules or units may be described by way of example, it can be appreciated that a greater or lesser number of modules or units may be used and still fall within the scope of the examples. Further, although various examples may be described in terms of modules or units to facilitate description, such modules or units may be implemented by one or more hardware components (e.g., embedded systems/peripherals, processors, chips, FPGAs, DSPs, PLDs, ASICs, circuits, registers, servers, clients, network switches and routers), software components (e.g., programs, subroutines, logic) and/or combination thereof. It can be appreciated that, in certain aspects, a single component may be replaced by multiple components, and multiple components may be replaced by a single component, to provide an element or structure or to perform a given function or functions. Except where such substitution would not be operative to practice certain examples of the present disclosure, such substitution is considered within the scope of the present disclosure. In one example, all or a portion of the system, its features or functional elements, modules, units, etc. or one or more steps of the method may be associated with, implemented by, executed on, or embedded in (e.g., as embedded software/firmware) one or more hardware components. Further, such one or more components so configured may be installed or associated with one or more devices and therein configured to perform the herein described system functionalities or methods. The modules or units may comprise, or be implemented as, one or more systems, sub-systems, devices, components, circuits, logic, programs, or any combination thereof, as desired for a given set of design or performance constraints. For example, the modules may comprise electronic elements fabricated on a substrate. In various implementations, the electronic elements may be fabricated using silicon-based IC processes such as complementary metal oxide semiconductor (CMOS), bipolar, and bipolar CMOS (BiCMOS) processes, for example. The examples are not limited in this context.

It may be appreciated that terms such as "processing", "generating", "determining", or the like, unless stated otherwise, refer to the action or processes of a computer or computing system, or similar electronic computing device, that manipulates or transforms data represented as physical quantities (e.g., electronic) within the computing system's registers or memories into other data similarly represented as physical quantities within the computing system's memories, registers or other such information storage, transmission or display devices. The examples are not limited in this context. An action such as "identifying" or "matching" when performed by a computer or computer system may include identification by determining, accessing system data, comparisons with system data, instructions, or the like. An action such as initiating may include causing an event or thing initiated either directly or indirectly. For example, initiating may include signaling, providing power or instructions, physical manipulation, transmission of data, calculation of conditions, or other step resulting in the event sought to be initiated. Furthermore, an action such as "storing", when used in reference to a computer or computer system, refers to any suitable type of storing operation including, for example, storing a value to memory, storing a value to cache memory, storing a value to a processor register, and/or storing a value to a non-volatile data storage device.

This specification has been written with reference to various non-limiting and non-exhaustive examples. However, it will be recognized by persons having ordinary skill in the art that various substitutions, modifications, or combinations of any of the disclosed examples (or portions thereof) may be made within the scope of this specification. Thus, it is contemplated and understood that this specification supports additional examples not expressly set forth in this specification. Such examples may be obtained, for example, by combining, modifying, or reorganizing any of the disclosed components, elements, features, aspects, characteristics, limitations, and the like, of the various non-limiting and non-exhaustive examples described in this specification. In this manner, Applicant reserves the right to amend the claims during prosecution to add features as variously described in this specification.

What is claimed is:

1. An apparatus comprising:
a display;
a memory;
a hardware processor communicatively coupled to the memory, the hardware processor configured to:
for each of one or more founding members of a company that includes one or more healthcare practices:
determine a value associated with the respective founding member;
display, on the display, the value associated with the respective founding member in a respective first cell of one or more graphical user interfaces;
access a price per share of the company from a database, a computer storage medium, or a stock exchange;
determine a number of shares in the company owned by the respective founding member based on the price per share of the company;
display, on the display, the number of shares in the company owned by the respective founding member in a respective second cell of the one or more graphical user interfaces that shares a first column or row with the respective first cell of the one or more graphical user interfaces;
determine a current value associated with the number of shares in the company owned by the respective founding member; and
display, on the display, the current value associated with the number of shares in the company owned by the respective founding member in a respective third cell of the one or more graphical user interfaces that shares the first column or row with the respective first cell of the one or more graphical user interfaces;
following a sale of the company:
determine a sale payout to the respective founding member based on the number of shares in the company owned by the respective founding member;
display, on the display, the sale payout to the respective founding member in a respective fourth cell of the one or more graphical user interfaces that shares the first column or row with the respective first cell of the one or more graphical user interfaces; and
process, for payment, the sale payout to the respective founding member by automatically causing a transfer of money from a financial institution associated with the company to a financial institution associated with the respective founding member;
for each of one or more equity contributing members of the company:
determine a value associated with the respective equity contributing member, wherein the value associated with the respective equity contributing member is based on a base earnings before interest, taxes, depreciation and amortization (EBITDA) associated with the respective equity contributing member;
display, on the display, the value associated with the respective equity contributing member in a respective fifth cell of the one or more graphical user interfaces;

determine a number of shares in the company owned by the respective equity contributing member based on the price per share of the company;

display, on the display, the number of shares in the company owned by the respective equity contributing member in a respective sixth cell of the one or more graphical user interfaces that shares a second column or row with the respective fifth cell of the one or more graphical user interfaces;

determine a current value associated with the number of shares in the company owned by the respective equity contributing member;

display, on the display, the current value associated with the number of shares in the company owned by the respective equity contributing member in a respective seventh cell of the one or more graphical user interfaces that shares the second column or row with the respective fifth cell of the one or more graphical user interfaces;

following each of one or more first periodic intervals:

determine a first current EBITDA associated with the respective equity contributing member;

determine a bonus payout to the respective equity contributing member based on a difference between the first current EBITDA associated with the respective equity contributing member and the base EBITDA associated with the respective equity contributing member;

display, on the display, the bonus payout to the respective equity contributing member in a respective eighth cell of the one or more graphical user interfaces that shares the second column or row with the respective fifth cell of the one or more graphical user interfaces;

process, for payment, the bonus payout to the respective equity contributing member by automatically causing a transfer of money from the financial institution associated with the company to a financial institution associated with the respective equity contributing member;

following the sale of the company:

determine a sale payout to the respective equity contributing member based on the number of shares in the company owned by the respective equity contributing member;

display, on the display, the sale payout to the respective equity contributing member in a respective ninth cell of the one or more graphical user interfaces that shares the second column or row with the respective fifth cell of the one or more graphical user interfaces; and process, for payment, the sale payout to the respective equity contributing member by automatically causing a transfer of money from the financial institution associated with the company to the financial institution associated with the respective equity contributing member;

for each of one or more non-equity contributing members of the company:

determine a base EBITDA associated with the respective non-equity contributing member;

determine a value associated with the respective non-equity contributing member based on the base EBITDA associated with the respective non-equity contributing member;

display, on the display, the value associated with the respective non-equity contributing member in a respective tenth cell of the one or more graphical user interfaces;

following each of the one or more first periodic intervals:

determine a first current EBITDA associated with the respective non-equity contributing member;

following a data request received from a second apparatus associated with the respective non-equity contributing member, transmit, over one or more networks, the first current EBITDA associated with the respective non-equity contributing member to the second apparatus associated with the respective non-equity contributing member;

determine a bonus payout to the respective non-equity contributing member based on a difference between the first current EBITDA associated with the respective non-equity contributing member and the base EBITDA associated with the respective non-equity contributing member;

display, on the display, the bonus payout to the respective non-equity contributing member in a respective eleventh cell of the one or more graphical user interfaces that shares a third column or row with the respective tenth cell of the one or more graphical user interfaces;

process, for payment, the bonus payout to the respective non-equity contributing member by automatically causing a transfer of money from the financial institution associated with the company to a financial institution associated with the respective non-equity contributing member;

following the sale of the company:

determine a second current EBITDA associated with the respective non-equity contributing member;

determine a sale payout to the respective non-equity contributing member based on the second current EBITDA associated with the respective non-equity contributing member, wherein the sale payout to the respective non-equity contributing member comprises one or more multiples of the second current EBITDA associated with the respective non-equity contributing member;

display, on the display, the sale payout to the respective non-equity contributing member in a respective twelfth cell of the one or more graphical user interfaces that shares the third column or row with the respective tenth cell of the one or more graphical user interfaces; and process, for payment, the sale payout to the respective non-equity contributing member by automatically causing a transfer of money from the financial institution associated with the company to the financial institution associated with the respective non-equity contributing member.

2. A system, comprising:
a first apparatus, comprising:
  a display;
  a memory;
  one or more processors communicatively coupled to the memory, the one or more processors configured to:
    for each of one or more founding members of a company that includes one or more healthcare practices:
      determine a value associated with the respective founding member;
      display, on the display, the value associated with the respective founding member in a respective first portion of one or more graphical user interfaces;
      access a price per share of the company from a database, a computer storage medium, or a stock exchange;
      determine a number of shares in the company owned by the respective founding member based on the price per share of the company;
      display, on the display, the number of shares in the company owned by the respective founding member in a respective second portion of the one or more graphical user interfaces that shares a first column or row with the respective first portion of the one or more graphical user interfaces;
      following a sale of the company:
        determine a sale payout to the respective founding member based on the number of shares in the company owned by the respective founding member;
        display, on the display, the sale payout to the respective founding member in a respective third portion of the one or more graphical user interfaces that shares the first column or row with the respective first portion of the one or more graphical user interfaces; and
        process, for payment, the sale payout to the respective founding member by automatically causing a transfer of money from a financial institution associated with the company to a financial institution associated with the respective founding member;
    for each of one or more equity contributing members of the company:
      determine a value associated with the respective equity contributing member, wherein the value associated with the respective equity contributing member is based on a base earnings before interest, taxes, depreciation and amortization (EBITDA) associated with the respective equity contributing member;
      display, on the display, the value associated with the respective equity contributing member in a respective fourth portion of the one or more graphical user interfaces;
      determine a number of shares in the company owned by the respective equity contributing member based on the price per share of the company;
      display, on the display, the number of shares in the company owned by the respective equity contributing member in a respective fifth portion of the one or more graphical user interfaces that shares a second column or row with the respective fourth portion of the one or more graphical user interfaces;
      following each of one or more first periodic intervals:
        determine a first current EBITDA associated with the respective equity contributing member;
        determine a bonus payout to the respective equity contributing member based on a difference between the first current EBITDA associated with the respective equity contributing member and the base EBITDA associated with the respective equity contributing member;
        display, on the display, the bonus payout to the respective equity contributing member in a respective sixth portion of the one or more graphical user interfaces that shares the second column or row with the respective fourth portion of the one or more graphical user interfaces; and
        process, for payment, the bonus payout to the respective equity contributing member by automatically causing a transfer of money from the financial institution associated with the company to a financial institution associated with the respective equity contributing member;
      following the sale of the company:
        determine a sale payout to the respective equity contributing member based on the number of shares in the company owned by the respective equity contributing member;
        display, on the display, the sale payout to the respective equity contributing member in a respective seventh portion of the one or more graphical user interfaces that shares the second column or row with the respective fourth portion of the one or more graphical user interfaces; and
        process, for payment, the sale payout to the respective equity contributing member by automatically causing a transfer of money from the financial institution associated with the company to the financial institution associated with the respective equity contributing member;
    for each of one or more non-equity contributing members of the company:
      determine a base EBITDA associated with the respective non-equity contributing member;
      determine a value associated with the respective non-equity contributing member based on the base EBITDA associated with the respective non-equity contributing member;
      display, on the display, the value associated with the respective non-equity contributing member in a respective eighth portion of the one or more graphical user interfaces;
      following each of the one or more first periodic intervals:
        determine a first current EBITDA associated with the respective non-equity contributing member;
        following a data request received from a second apparatus associated with the respective non-equity contributing member, transmit, over one or more networks, the first current EBITDA associated with the respective non-equity contributing member to the second apparatus associated with the respective non-equity contributing member;

determine a bonus payout to the respective non-equity contributing member based on a difference between the first current EBITDA associated with the respective non-equity contributing member and the base EBITDA associated with the respective non-equity contributing member;

display, on the display, the bonus payout to the respective non-equity contributing member in a respective ninth portion of the one or more graphical user interfaces that shares a third column or row with the respective eighth portion of the one or more graphical user interfaces; and process, for payment, the bonus payout to the respective non-equity contributing member by automatically causing a transfer of money from the financial institution associated with the company to a financial institution associated with the respective non-equity contributing member;

following the sale of the company:

determine a second current EBITDA associated with the respective non-equity contributing member;

determine a sale payout to the respective non-equity contributing member based on the second current EBITDA associated with the respective non-equity contributing member, wherein the sale payout to the respective non-equity contributing member comprises one or more multiples of the second current EBITDA associated with the respective non-equity contributing member;

display, on the display, the sale payout to the respective non-equity contributing member in a respective tenth portion of the one or more graphical user interfaces that shares the third column or row with the respective eighth portion of the one or more graphical user interfaces; and process, for payment, the sale payout to the respective non-equity contributing member by automatically causing a transfer of money from the financial institution associated with the company to the financial institution associated with the respective non-equity contributing member.

3. The system of claim 2, wherein the one or more processors are further configured to:

for each of one or more referring members of the company:

following the sale of the company:

determine a current EBITDA associated with the referring member, wherein the current EBITDA associated with the referring member comprises a current EBITDA associated with a healthcare practice referred to the company by the referring member;

determine a sale payout to the respective referring member based on the current EBITDA associated with the referring member, wherein the sale payout to the respective referring member comprises a multiple of the current EBITDA associated with the referring member; and display, on the display, the sale payout to the respective referring member in a respective eleventh portion of the one or more graphical user interfaces.

4. The system of claim 2, wherein the first, second, third, fourth, fifth, sixth, seventh, eighth, ninth, and tenth portions each comprise a respective cell of the one or more graphical user interfaces.

5. The system of claim 2, wherein the one or more graphical user interfaces comprise a single graphical user interface.

6. The system of claim 2, further comprising:

a third apparatus associated with an equity contributing member of the one or more equity contributing members of the company, wherein the third apparatus is configured to:

display, on a display of the third apparatus, the value associated with the equity contributing member;

display, on the display of the third apparatus, the number of shares in the company owned by the equity contributing member;

following each of one or more first periodic intervals, display, on the display of the third apparatus, the bonus payout to the equity contributing member; and following the sale of the company, display, on the display of the third apparatus, the sale payout to the equity contributing member.

7. The system of claim 6, further comprising:

the second apparatus associated with the respective non-equity contributing member, wherein the second apparatus is configured to:

display, on a display of the second apparatus, the value associated with the respective non-equity contributing member;

following each of one or more first periodic intervals, display, on the display of the second apparatus, the bonus payout to the respective non-equity contributing member; and following the sale of the company, display, on the display of the second apparatus, the sale payout to the respective non-equity contributing member.

8. The system of claim 7, further comprising:

a fourth apparatus associated with a founding member of the one or more founding members of the company, wherein the fourth apparatus is configured to:

display, on a display of the fourth apparatus, the value associated with the founding member;

display, on the display of the fourth apparatus, the number of shares in the company owned by the founding member; and following the sale of the company, display, on the display of the fourth apparatus, the sale payout to the founding member.

9. The system of claim 2, wherein:

the one or more non-equity contributing members of the company comprise a first non-equity contributing member and a second non-equity contributing member;

the sale payout to the first non-equity contributing member comprises a sum of (i) a first multiple of the second current EBITDA associated with the first non-equity contributing member, and (ii) a second multiple of the second current EBITDA associated with the first non-equity contributing member; and the sale payout to the second non-equity contributing member comprises a third multiple of the second current EBITDA associated with the second non-equity contributing member.

10. A method, comprising:
for each of one or more founding members of a company that includes one or more healthcare practices:
  determining, by one or more processors of a first apparatus, a value associated with the respective founding member;
  displaying, by the one or more processors of the first apparatus, the value associated with the respective founding member in a respective first portion of one or more graphical user interfaces;
  accessing, by the one or more processors of the first apparatus, a price per share of the company from a database, a computer storage medium, or a stock exchange; determining, by the one or more processors of the first apparatus, a number of shares in the company owned by the respective founding member based on the price per share of the company;
  displaying, by the one or more processors of the first apparatus, the number of shares in the company owned by the respective founding member in a respective second portion of the one or more graphical user interfaces that shares a first column or row with the respective first portion of the one or more graphical user interfaces;
  following a sale of the company:
    determining, by the one or more processors of the first apparatus, a sale payout to the respective founding member based on the number of shares in the company owned by the respective founding member;
    displaying, by the one or more processors of the first apparatus, the sale payout to the respective founding member in a respective third portion of the one or more graphical user interfaces that shares the first column or row with the respective first portion of the one or more graphical user interfaces; and
    processing, by the one or more processors of the first apparatus, for payment, the sale payout to the respective founding member by automatically causing a transfer of money from a financial institution associated with the company to a financial institution associated with the respective founding member;
for each of one or more equity contributing members of the company:
  determining, by the one or more processors of the first apparatus, a value associated with the respective equity contributing member, wherein the value associated with the respective equity contributing member is based on a base earnings before interest, taxes, depreciation and amortization (EBITDA) associated with the respective equity contributing member;
  displaying, by the one or more processors of the first apparatus, the value associated with the respective equity contributing member in a respective fourth portion of the one or more graphical user interfaces;
  determining, by the one or more processors of the first apparatus, a number of shares in the company owned by the respective equity contributing member based on the price per share of the company; and
  displaying, by the one or more processors of the first apparatus, the number of shares in the company owned by the respective equity contributing member in a respective fifth portion of the one or more graphical user interfaces that shares a second column or row with the respective fourth portion of the one or more graphical user interfaces;
  following each of one or more first periodic intervals:
    determining, by the one or more processors of the first apparatus, a first current EBITDA associated with the respective equity contributing member;
    determining, by the one or more processors of the first apparatus, a bonus payout to the respective equity contributing member based on a difference between the first current EBITDA associated with the respective equity contributing member and the base EBITDA associated with the respective equity contributing member;
    displaying, by the one or more processors of the first apparatus, the bonus payout to the respective equity contributing member in a respective sixth portion of the one or more graphical user interfaces that shares the second column or row with the respective fourth portion of the one or more graphical user interfaces; and
    processing, by the one or more processors of the first apparatus, for payment, the bonus payout to the respective equity contributing member by automatically causing a transfer of money from the financial institution associated with the company to a financial institution associated with the respective equity contributing member;
  following the sale of the company:
    determining, by the one or more processors of the first apparatus, a sale payout to the respective equity contributing member based on the number of shares in the company owned by the respective equity contributing member;
    displaying, by the one or more processors of the first apparatus, the sale payout to the respective equity contributing member in a respective seventh portion of the one or more graphical user interfaces that shares the second column or row with the respective fourth portion of the one or more graphical user interfaces; and
    processing, by the one or more processors of the first apparatus, for payment, the sale payout to the respective equity contributing member by automatically causing a transfer of money from the financial institution associated with the company to the financial institution associated with the respective equity contributing member;
for each of one or more non-equity contributing members of the company:
  determining, by the one or more processors of the first apparatus, a base EBITDA associated with the respective non-equity contributing member;
  determining, by the one or more processors of the first apparatus, a value associated with the respective non-equity contributing member based on the base EBITDA associated with the respective non-equity contributing member; and
  displaying, by the one or more processors of the first apparatus, the value associated with the respective non-equity contributing member in a respective eighth portion of the one or more graphical user interfaces;

following each of the one or more first periodic intervals:
   determining, by the one or more processors of the first apparatus, a first current EBITDA associated with the respective non-equity contributing member;
   following a data request received from a second apparatus associated with the respective non-equity contributing member, transmitting, by the one or more processors of the first apparatus, over one or more networks, the first current EBITDA associated with the respective non-equity contributing member to the second apparatus associated with the respective non-equity contributing member;
   determining, by the one or more processors of the first apparatus, a bonus payout to the respective non-equity contributing member based on a difference between the first current EBITDA associated with the respective non-equity contributing member and the base EBITDA associated with the respective non-equity contributing member;
   displaying, by the one or more processors of the first apparatus, the bonus payout to the respective non-equity contributing member in a respective ninth portion of the one or more graphical user interfaces that shares a third column or row with the respective eighth portion of the one or more graphical user interfaces; and
   processing, by the one or more processors of the first apparatus, for payment, the bonus payout to the respective non-equity contributing member by automatically causing a transfer of money from the financial institution associated with the company to a financial institution associated with the respective non-equity contributing member;
following the sale of the company:
   determining, by the one or more processors of the first apparatus, a second current EBITDA associated with the respective non-equity contributing member;
   determining, by the one or more processors of the first apparatus, a sale payout to the respective non-equity contributing member based on the second current EBITDA associated with the respective non-equity contributing member, wherein the sale payout to the respective non-equity contributing member comprises one or more multiples of the second current EBITDA associated with the respective non-equity contributing member;
   displaying, by the one or more processors of the first apparatus, the sale payout to the respective non-equity contributing member in a respective tenth portion of the one or more graphical user interfaces that shares the third column or row with the respective eighth portion of the one or more graphical user interfaces; and
   processing, by the one or more processors of the first apparatus, for payment, the sale payout to the respective non-equity contributing member by automatically causing a transfer of money from the financial institution associated with the company to the financial institution associated with the respective non-equity contributing member.

11. The method of claim 10, wherein the first, second, third, fourth, fifth, sixth, seventh, eighth, ninth, and tenth portions each comprise a respective cell of the one or more graphical user interfaces.

12. The method of claim 10, wherein the one or more graphical user interfaces comprise a single graphical user interface.

13. The method of claim 10, further comprising:
   displaying, on a display of a third apparatus associated with an equity contributing member of the one or more equity contributing members of the company, the value associated with the equity contributing member;
   displaying, on the display of the third apparatus, the number of shares in the company owned by the equity contributing member;
   following each of one or more first periodic intervals, displaying, on the display of the third apparatus, the bonus payout to the equity contributing member; and
following the sale of the company, displaying, on the display of the third apparatus, the sale payout to the equity contributing member.

14. The method of claim 13, further comprising:
   displaying, on a display of the second apparatus associated with the respective non-equity contributing member, the value associated with the respective non-equity contributing member;
   following each of one or more first periodic intervals, displaying, on the display of the second apparatus, the bonus payout to the respective non-equity contributing member; and
   following the sale of the company, displaying, on the display of the second apparatus, the sale payout to the respective non-equity contributing member.

15. The method of claim 14, further comprising:
   displaying, on a display of a fourth apparatus associated with a founding member of the one or more founding members of the company, the value associated with the founding member; displaying, on the display of the fourth apparatus, the number of shares in the company owned by the founding member; and
   following the sale of the company, displaying, on the display of the fourth apparatus, the sale payout to the founding member.

16. The method of claim 10, wherein:
   the one or more non-equity contributing members of the company comprise a first non-equity contributing member and a second non-equity contributing member;
   the sale payout to the first non-equity contributing member comprises a sum of (i) a first multiple of the second current EBITDA associated with the first non-equity contributing member, and (ii) a second multiple of the second current EBITDA associated with the first non-equity contributing member; and
   the sale payout to the second non-equity contributing member comprises a third multiple of the second current EBITDA associated with the second non-equity contributing member.

* * * * *